(12) United States Patent
Braime (10) Patent No.: US 10,961,056 B2
(45) Date of Patent: Mar. 30, 2021

(54) ELEVATOR BUCKETS

(71) Applicant: BRAIME GROUP PLC, Leeds (GB)

(72) Inventor: Nicholas Braime, Leeds (GB)

(73) Assignee: BRAMME GROUP PLC, Leeds (GB)

( * ) Notice: Subject to any disclaimer, the term of this patent is extended or adjusted under 35 U.S.C. 154(b) by 0 days.

(21) Appl. No.: 16/243,918

(22) Filed: Jan. 9, 2019

(65) Prior Publication Data

US 2019/0225425 A1 Jul. 25, 2019

(30) Foreign Application Priority Data

Jan. 9, 2018 (GB) ..................................... 1800350

(51) Int. Cl.
| | |
|---|---|
| *B65G 17/36* | (2006.01) |
| *B65G 27/34* | (2006.01) |
| *B65G 17/42* | (2006.01) |
| *B29C 45/26* | (2006.01) |
| *B29K 75/00* | (2006.01) |
| *B29L 31/00* | (2006.01) |

(52) U.S. Cl.
CPC .......... *B65G 17/42* (2013.01); *B29C 45/2628* (2013.01); *B65G 17/365* (2013.01); *B29K 2075/00* (2013.01); *B29L 2031/712* (2013.01)

(58) Field of Classification Search
CPC ........ B65G 17/36; B65G 27/04; B65G 27/34; B65G 65/20
USPC ........................................ 198/701, 712, 713
See application file for complete search history.

(56) References Cited

U.S. PATENT DOCUMENTS

| | | | | |
|---|---|---|---|---|
| 1,000,034 | A * | 8/1911 | Hart, Jr. .................... | B60L 5/06 191/61 |
| 2,501,229 | A * | 3/1950 | Lindfors .............. | B65G 17/126 198/713 |
| 2,625,830 | A * | 1/1953 | Transeau ............... | B65G 17/42 198/853 |
| 3,381,796 | A * | 5/1968 | Vaughn .................. | B65G 17/48 198/706 |
| 4,246,999 | A * | 1/1981 | Bryant ................... | B65G 17/36 198/713 |
| 4,548,314 | A * | 10/1985 | Marsh .................. | B65G 17/126 198/712 |
| 6,695,127 | B1 * | 2/2004 | Dobranski ............. | B65G 17/36 198/711 |
| 7,097,027 | B1 * | 8/2006 | Chen ...................... | B65G 17/36 198/703 |
| 7,698,839 | B1 * | 4/2010 | Phillips ..................... | E02F 3/40 37/444 |
| D721,743 | S * | 1/2015 | Taylor .......................... | D15/21 |
| D748,157 | S * | 1/2016 | Phillips .......................... | D15/32 |

(Continued)

FOREIGN PATENT DOCUMENTS

| | | |
|---|---|---|
| CN | 202864268 U | 4/2013 |
| CN | 108001950 A | 5/2018 |

*Primary Examiner* — Douglas A Hess
(74) *Attorney, Agent, or Firm* — Jeanette M. Braun; Braun SP Law, LLC (57) ABSTRACT

Some elevator buckets 1, 11, 21, 31, 41 have aperture orifices 2, 3, 4, 12, 22; 42, 43, 44, 52. Traditionally, these aperture orifices are formed by drilling a solid bucket wall but by provided aperture features 12', 13', 52' in a moulded bucket with some already moulded aperture orifices then some markers or pre-cursors for aperture orifices are provided and provision of elevator buckets is more efficient with aperture orifices.

13 Claims, 9 Drawing Sheets

(56) References Cited

U.S. PATENT DOCUMENTS

| | | | |
|---|---|---|---|
| 9,278,468 B2 * | 3/2016 | Wheat | B29C 45/2673 |
| D792,485 S * | 7/2017 | Guggino | D15/32 |
| 2018/0141757 A1 | 5/2018 | Hart, Jr. | |

* cited by examiner

ELEVATOR BUCKETS

CROSS-REFERENCE TO RELATED APPLICATIONS

This application claims priority to UK Patent Application No. GB 1800350.9, titled ELEVATOR BUCKETS, and filed Jan. 9, 2018, which is hereby incorporated herein by reference in its entirety for all purposes.

BACKGROUND

This invention relates generally to elevator buckets and more particularly to methods of making and elevator buckets used in conveyor systems for bulk materials such as grains, gravel and the like.

Conveyor systems are widely used to move loose bulk materials about docks, silo facilities, quarries and other industrial plants. The conveyor is a belt or chain upon which elevator buckets are located at spaced positions so that the bulk materials can be lifted that is to say elevated to a height for loading or otherwise. It will be appreciated the nature of bulk materials means that the buckets must be robust and hardwearing but also relatively cost effective. Thus, elevator buckets tend to be made of robust metals such as steel or aluminum or moulded with tough plastics materials in standard forms and sizes.

There can be circumstances where a more specifically designed elevator bucket for a particular situation would be desirable. For example, the bulk materials will be dumped into and will be dumped/drop evacuated from the bucket and such sudden loading or un-loading may create issues with trapped air in the bottom of the elevator bucket. Trapped air may marginally reduce the amount of material picked upon by the bucket and this could have significant effects upon the overall performance of a conveyor system running at high rates. Similarly with sudden dumping of the bulk material there may be a slight transient vacuum suction at the bottom of the elevator which may mean that the conveyor system needs to be operated at a marginally slower rate. However, possibly the biggest issue with wet materials is that there may be pooled water which adds to moved weight so energy needs and costs but also possibly aggravates the above problems. A solution is to provide elongate aperture in the bottom of the elevator bucket but not all elevator buckets need elongate aperture and so rather than originally forming buckets with elongate aperture these elongate aperture are formed by drilling whilst other hole formation techniques are not suitable due to the robust materials and thicknesses of bucket walls.

SUMMARY

In accordance with first aspects of the present invention there is provided an elevator bucket comprising as scoop with a plurality of aperture features, at least one aperture feature defining an elongate orifice when formed as a vent with a greater length than width to inhibit blockage.

A number of other aperture features can be rendered as aperture orifices when the bucket is formed and/or aperture feature pre-forms defined for where additional apertures including elongate orifices can be formed in the bucket. The bucket may be formed of a plastics material by moulding in a mould.

The aperture features include a number of orifices in a wall of the scoop.

The aperture features are a number of variations in the thickness depth of a wall of the scoop.

The aperture feature pre-forms may be a number of markings formed in the scoop. The markings may be ridges or ribs or indentations in the scoop. The markings may provide a guide for routing or punching an elongate orifice in a wall of the scoop.

The aperture features may define one or more predetermined orifice patterns in the scoop. Each orifice pattern may comprise a distinct type of aperture feature. Each orifice pattern may have a distinct number or letter or symbol for identification in the plurality of aperture features.

As in accordance with second aspects of the present invention there is provided a method of forming an elevator bucket, the method comprising providing a mould for a plastics material, the mould having relief aperture features to define elongate aperture orifices in an aperture pattern in the bucket, rendering at least one aperture pattern active within the mould and moulding an elevator bucket with a plastics material in the mould with that at least one aperture pattern whereby at least one aperture orifice is formed in the elevator bucket and other aperture patterns can be determined.

The relief aperture features include a peg whereby an orifice is formed in the elevator bucket when moulded by the peg extending across the width of a wall of the elevator bucket as moulded. The peg may be removed.

The relief aperture features include a depression or rib or ridge to form an aperture feature in relief within the elevator bucket.

BRIEF DESCRIPTION OF THE DRAWINGS

Embodiments of the invention will now be described by way of example only with reference to the accompanying drawings in which:

FIG. 1 provides as FIG. 1a a plan view of an elevator bucket in accordance with first aspects of the present invention with a single row of elongate apertures as vents and FIG. 1b a rear view and FIG. 1c a cross-sectional view of the elevator bucket depicted in FIG. 1a;

FIG. 4 provides as FIG. 4a a plan view of an elevator bucket in accordance with fourth aspects of the present invention with a single row of slots and FIG. 4b a rear view and FIG. 4c a cross-sectional view of the elevator bucket depicted in FIG. 4a;

FIG. 6 provides as FIG. 6a a side plan view of a first part of an elevator bucket mould in accordance with embodiments of the present invention with pegs for forming the oval vents and FIG. 6b a side plan view of a second part of an elevator bucket mould and FIG. 6c a side plan view of the top portion engaged with the bottom bottom portion of the elevator bucket mould;

FIG. 7 provides as FIG. 7a a front plan view of a first part of an elevator bucket mould in accordance with embodiments of the present invention with pegs for forming the oval vents and FIG. 7b a front plan view of a second part of an elevator bucket mould and FIG. 7c a front plan view of the top portion engaged with the bottom portion of the elevator bucket mould;

FIG. 8 provides as FIG. 8a a front plan view of a first part of an elevator bucket mould in accordance with embodiments of the present invention with pegs for forming the oval vents and FIG. 8b a front plan view of a second part of an elevator bucket mould and FIG. 8c a front plan view of the top portion engaged with the bottom portion of the elevator bucket mould; and FIG. 9 provides as FIG. 9a a front plan view of a first part of an elevator bucket mould in accordance with embodiments of the present invention with pegs for forming the oval vents and FIG. 9b a front plan view of a second part of an elevator bucket mould and FIG. 9c a front plan view of the top portion engaged with the bottom portion of the elevator bucket mould.

DETAILED DESCRIPTION

It is known to manufacture and provide solid elevator buckets in metal and plastics materials. It is also known to drill such solid formed buckets to provide elongate aperture as required but this is an expensive and time consuming process. Each bucket will need a relatively large number of drilled holes. The drilling process itself may marginally temper a metal bucket or weaken a plastic bucket about each hole meaning the bucket is more liable to wear at the edges of the hole. Holes if not properly formed can act as nucleation points for cracking particularly if formed of metal or harder plastics materials. Furthermore each customer may have different requirements so a set of buckets with holes may be a custom or bespoke purchase. It will also be understood that drilling is a limited process in that a round hole is produced when ideally other hole or aperture shapes may be better suited to particular situations and/or bulk materials.

Round holes are offered in plastic buckets, especially in the USA but there is a high cost of drilling holes in the bottom of the bucket. Aspects of the present invention propose forming elongate orifices or slots during a moulding process using slots as opposed to round holes has as significant technical advantages. With elongate orifices these can be regular symmetrical slots or specifically shaped, oriented and sized for a particular bucket use with differently sized, shaped and distributed elongate orifices for best performance. However, elongate apertures or orifices such as slots will have a length in the elongate direction greater than its width. Thus, material lifted in the scoop of the bucket in a granular or particulate form will have a dimension greater than the width of the slot but the length of the elongate orifice or aperture mean that at least some of the slot/aperture/orifice is open to allow venting. Initially forming the elongate slots in a moulding process is advantages as it is easier to form such slots or elongate orifices at that stage rather than by punching or routing and certainly drilling.

Elongate orifices have a better performance compared to round holes in plastic buckets, which typically have wall/bottom thickness of 4 to 10 mm thickness (depending on the bucket size). Round holes are easier to drill but simply block up with the product being handled by the bucket, such as Grain- and even more so if it is a light product like animal meal or flour- and even more so, if the material is damp.

The purpose of venting an elevator bucket is to allow air to pass out of the bottom of the bucket, which would otherwise be trapped in the bottom of the bucket. If the holes are blocked and material trapped in the bucket bottom, some of the material from the previous filling of the bucket just remains and goes round and round in each cycle of the Bucket Elevator. This can reduce the amount of new material being carried in the bucket on the next cycle. This can significantly reduce the volume and tonnage being lifted per hour by a bucket elevator system. Additionally air vents in the bottom of the bucket can help the bucket fully empty on each cycle of the machine and this also alters the load capacity per hour of a system. The vents allow air to enter the bucket as the material is displaced out of the bucket upon emptying. Vents in the form of elongate apertures such as slots in a plastic bucket with its thick walls (as opposed to holes in a thinner steel bucket) provide a much better performance because the vents work, whereas holes do not because they easily block up.

Elevator buckets can be moulded from a plastics material in solid form. However, moulds are expensive so providing a different mould for different desired vent patterns would itself be expensive. Ideally the same mould could be used for solid as well as vented elevator buckets so that a manufacturer has at least three basic options—initial solid walled buckets and moulded vent buckets then routed or otherwise processed to create solid walled buckets with a bespoke vent pattern or moulded already vented buckets with additional elongate apertures to those in the original mould vent pattern formed in the bucket during the mould manufacturing process if required. This will give a wider range of options and potentially shorter delivery times for a set of elevator buckets. For example a stock of a basic moulded vent buckets could be retained by a manufacturer so it is only necessary to add by routing or otherwise further elongate apertures in a pattern required by the end user. In short at the very least there will be fewer elongate apertures form in the partially prepared moulded elevator bucket pre-form to achieve a wider aperture orifice pattern.

Using a moulding method of manufacture of elevator buckets allows formation of elevator buckets in accordance with aspects of the present invention. Metal elevator buckets are typically pressed. Elevator buckets in accordance with aspects of the present invention will be formed of a tough plastics material such Polyurethane (PU). Of importance with regard to the method of manufacture as well as the elevator bucket itself is the mould used. In view of the expense and as well as the need to store a large number of moulds aspects of the present invention provide a mould which can serve several bucket forms and configurations.

The process and method of forming elevator buckets by plastics moulding is well known and understood by persons skilled in the technology. Essentially a plastics material is injected into a mould in the shape of the desired product in this case an elevator bucket. There are a number of technical issues with the process and a need to ensure in particular that the mould is filled, the plastics material hardens correctly, mould durability and that the component can be removed from the mould etc. but these are technical issues rather than insurmountable problems. Design of the mould creates the desired advantageous features to facilitate fewer manufacturing steps post or subsequent to moulding prior to achieving a final product in this case an elevator bucket for an end user.

A mould in accordance with aspects of the present invention will be formed from conventional materials and may be cooled etc. The mould as with all moulds will provide a cavity with wall surfaces which define the negative of the final elevator bucket. This final elevator bucket as discussed in accordance with aspects of the present invention will include apertures or orifices to provide benefits to the bucket as defined herein. To provide these vent apertures and/or orifices in desired aperture patterns the mould will include in its wall surfaces aperture features. These aperture features can be combinations of pegs, plugs, recesses, ridges, mounds and depressions which each provide a multi-functional nature for the mould in terms of the capability of the mould to be part of a manufacturing process for a number of elevator bucket configurations as described later with regard to FIGS. 1 to 9.

Pegs by their nature will extend between wall surfaces of the mould (see FIGS. 6-9, 53). With a peg 53 in place it will be understood that an orifice or aperture will be created in the final elevator bucket. The pegs 53 may be permanent or removable from the mould, with a peg 53 in place an orifice is provided at a particular position in the elevator bucket when moulded. If the peg 53 is removed then normally a socket will exist at this position in the wall surface. These sockets may be filled with a plug. Some plugs might simply render the wall surface across the socket smooth or flat whilst other plugs might act to provide bumps and mounds partially impinging upon the thickness of the moulded elevator bucket wall depth. It will understood that elevator buckets are tough robust industrial components so within reason aesthetic appearance is less important than practical functionality. There may be some flaying and/or frayed edging about imperfect plug closure in the socket but this will normally be acceptable to an end user if the function is acceptable and of course the price is right.

Recesses, ridges, mounds and depressions in the mould wall surfaces can be simply categorised as variations in the mould wall surface above and/or below the smooth continuity of the surface which may be flat or a curve. These variations will make aperture features noticeable upon inspection of the elevator bucket once moulded. Of interest with regard to aspects of the present invention are variations which allow vent aperture patterns to be defined in the elevator bucket as made by the method and the mould. As indicated above elevator buckets can be made with solid walls or with actual orifice apertures in a pattern already formed in the bucket wall. In either event with recesses, ridges, mounds and depressions to provide aperture features in accordance with aspects of the present invention mean further vent aperture orifices can be provided in accordance with end consumer requirements. A stock of solid wall and more normally at least having a basic vent aperture orifice pattern in the mould elevator bucket can be provided. A solid wall elevator bucket in accordance with aspects of the present invention will have aperture features moulded into them so these aperture features define a plurality of aperture orifice patterns whereby the aperture features act as a guide at least to forming a desired aperture orifice set as a pattern in the elevator bucket. Such buckets as a stock can be more readily and probably accurately be finally formed into a desired orifice pattern by selection of the correct group of aperture features for the pattern. Such selection may be by a manual operative looking for distinctive reference features such as letters, numbers or symbols to indicate which aperture features to be drilled, punched or otherwise processed. Alternative it will be understood that some aperture features could act as reference points for automatic processing machinery for drilling, punching or otherwise processing relative to those reference point aperture orifices in the desired aperture pattern.

Of particular interest with regard to aspects of the present invention are provision of moulded elevator buckets which have at least one and normally a plurality of aperture orifices moulded and formed with the elevator bucket as originally moulded. These base elongate vent aperture orifices as originally made by the moulding process could provide a base orifice pattern which may be acceptable to some final users or added to in terms of aperture orifices to a pattern. However, in accordance with aspects of the present invention these as moulded aperture orifices provide two more features of potential benefit. The base orifice pattern provide a 'stock' bucket when moulded with other aperture features at manufacture to allow a much wider range of aperture patterns to be available to an end user. These aperture patterns may be standard in that the end user will specify the aperture pattern required. The aperture orifices in addition to those already moulded initially will be created by appropriate processes such as drilling, punching etc. Alternatively, the as moulded elevator bucket will have a plurality of elongate aperture features some already moulded as aperture orifices into the bucket as formed and all the other aperture features can then be incorporated into a bespoke aperture pattern for a particular end user and/or a desired specific function for the elevator bucket. Any aperture feature can provide an anchor reference in the as moulded bucket. Of particular advantage of an as formed moulded aperture orifice is that it is permanent, robust and provides a good anchor point to allow automatic machining by automatic apparatus anchored and/or referencing from that as moulded aperture orifice.

It will be understood that elevator buckets by the nature of their duties need to be robust. Elevator buckets will have relatively thick walls so aperture features to act as guides to aperture patterns can not only be ribs and ridges upstanding in a wall surface of the bucket but also depression and grooves in the wall. Depressions will be of a depth so that punching is easily performed to create additional aperture orifices in the desired vent aperture pattern with less material to be removed as the wall thickness is less. Grooves and channels provide lines of weakness which can be exploited by a punching action to knock out the aperture orifices of the desired aperture pattern in the final elevator bucket. Without aperture features in the form of depressions and grooves the bucket wall would be too thick for punching.

Depressions, grooves and channels not needed in the final aperture pattern or elevator bucket might create issues with wear and tear upon the elevator bucket. In such circumstance at least the inner wall surface of a scoop of the bucket may be infilled so that any depressions, grooves and channels are filled to make the surface at least roughly consistent with the wall surface to the sides of the aperture feature, depression or groove or channel.

Plastic moulding is used to provide elevator buckets in accordance with aspects of the present invention. The methods and techniques of plastic moulding are well known to those involved in this technology and relate to ensure good distribution and fill of a mould to provide the product as here an elevator bucket. In terms of creating an elevator bucket in accordance with aspect of the present invention as indicated a mould is provided. A significant proportion of the cost of plastic moulding is the mould used. Cheaper moulds tend to only be useful for a smaller number of moulded products off whilst more expensive mould generally made of more resilient materials can be justified to produce much higher bucket numbers. Small production numbers may not justify the cost of an expensive mould tool so individual mould for each aperture patterns will be difficult to justify. It will be appreciated that by aspects of the present invention there is more justification for using more expensive moulds. Each mould will produce at least an intermediate base aperture orifice pattern elevator bucket to which more aperture orifices can be added if required. Thus, the base aperture orifice elevator bucket will be acceptable for some end users but others will require additional aperture orifices which will be pre-formed in the aperture features moulded in to a scoop of the as moulded elevator bucket or can be formed by an automated process relative to the as formed aperture features; at least one aperture orifice. One mould can serve a wide variety of end users including possibly those requiring a solid wall elevator bucket provided the one aperture orifice is position in a suitable location away from the operational surfaces of the elevator bucket i.e. high up near a lip of scoop.

Figure 1:
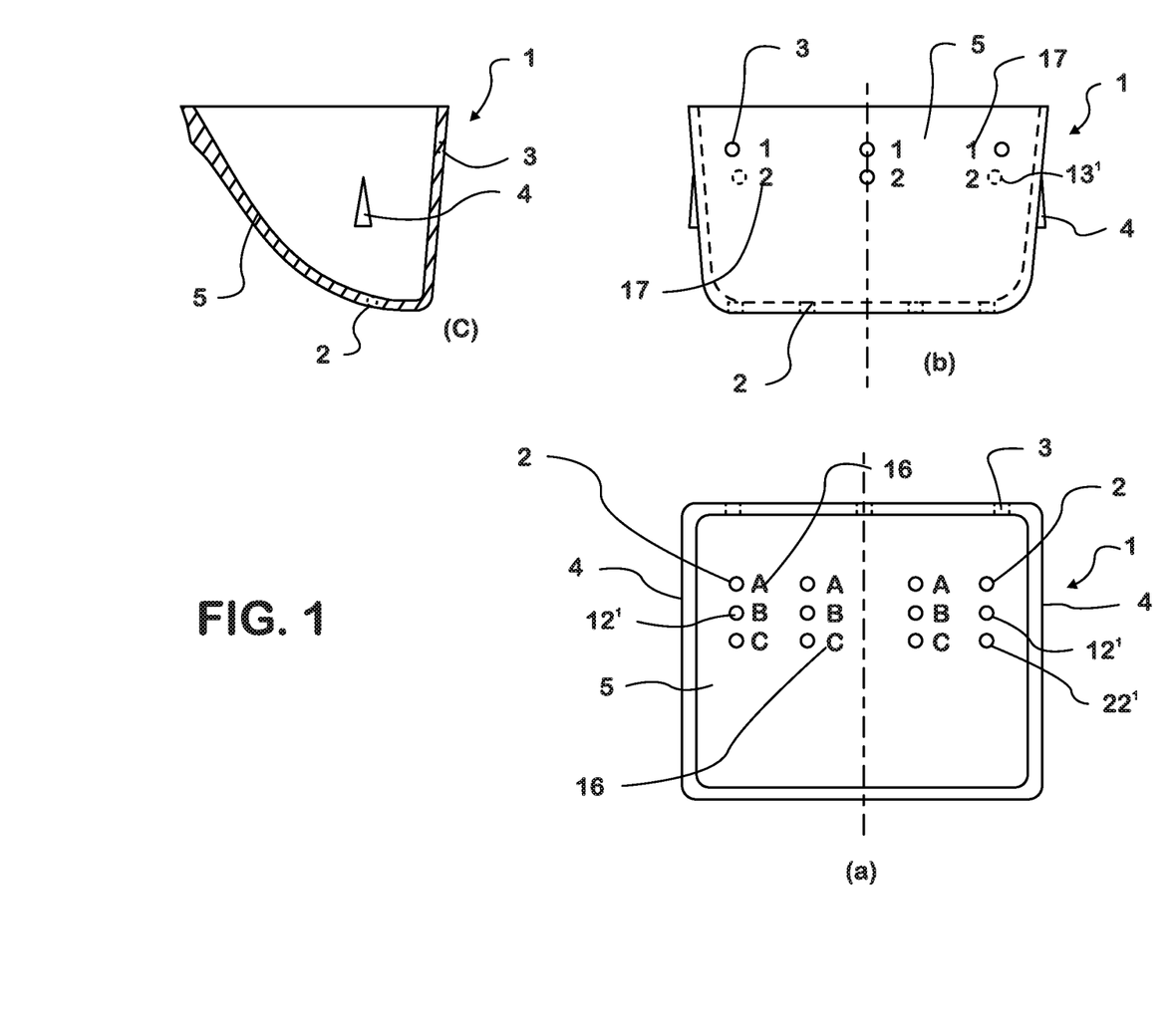
Figure 2:
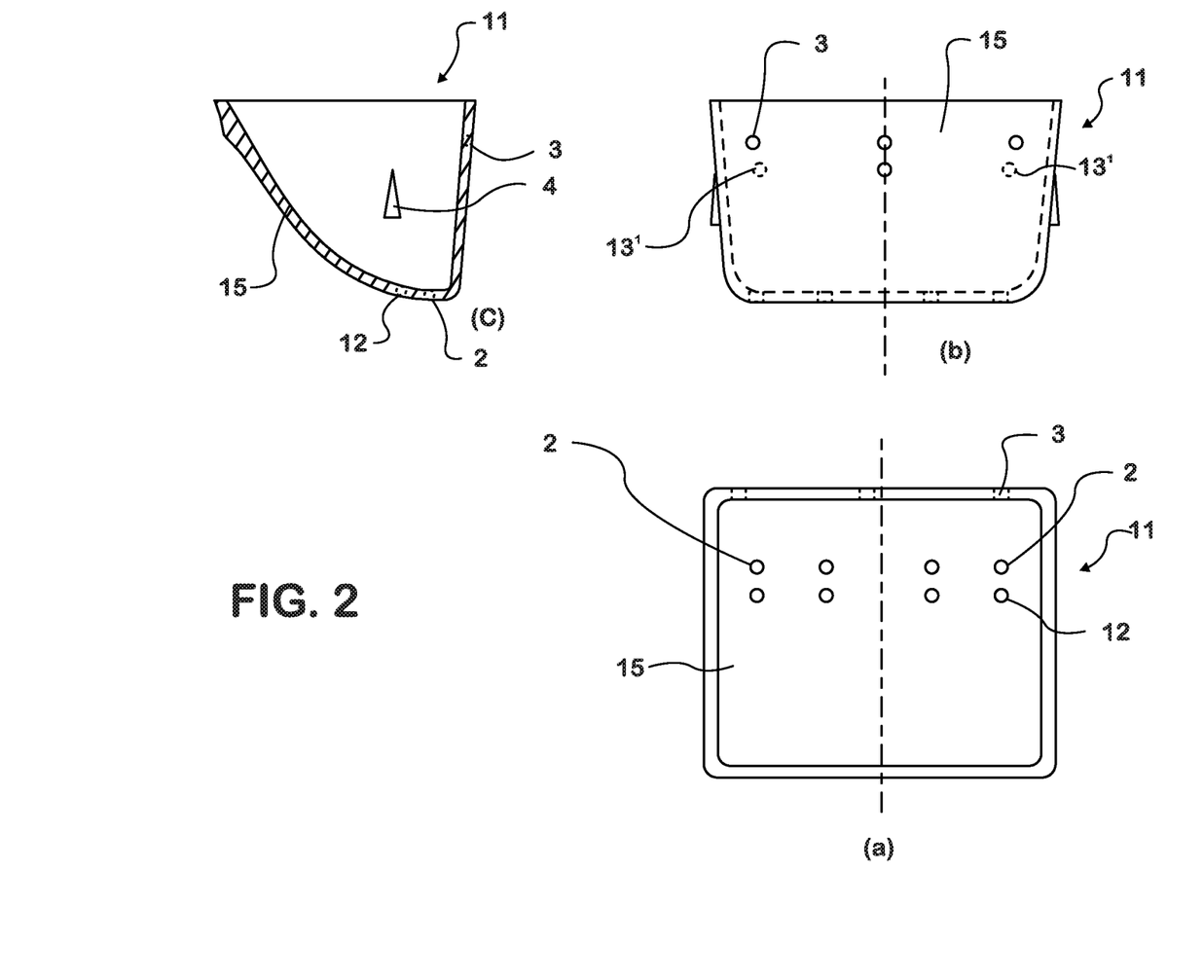
FIG. 2 provides plan, rear and cross-sectional views of an elevator bucket in accordance with second aspects of the present invention.
Figure 3:
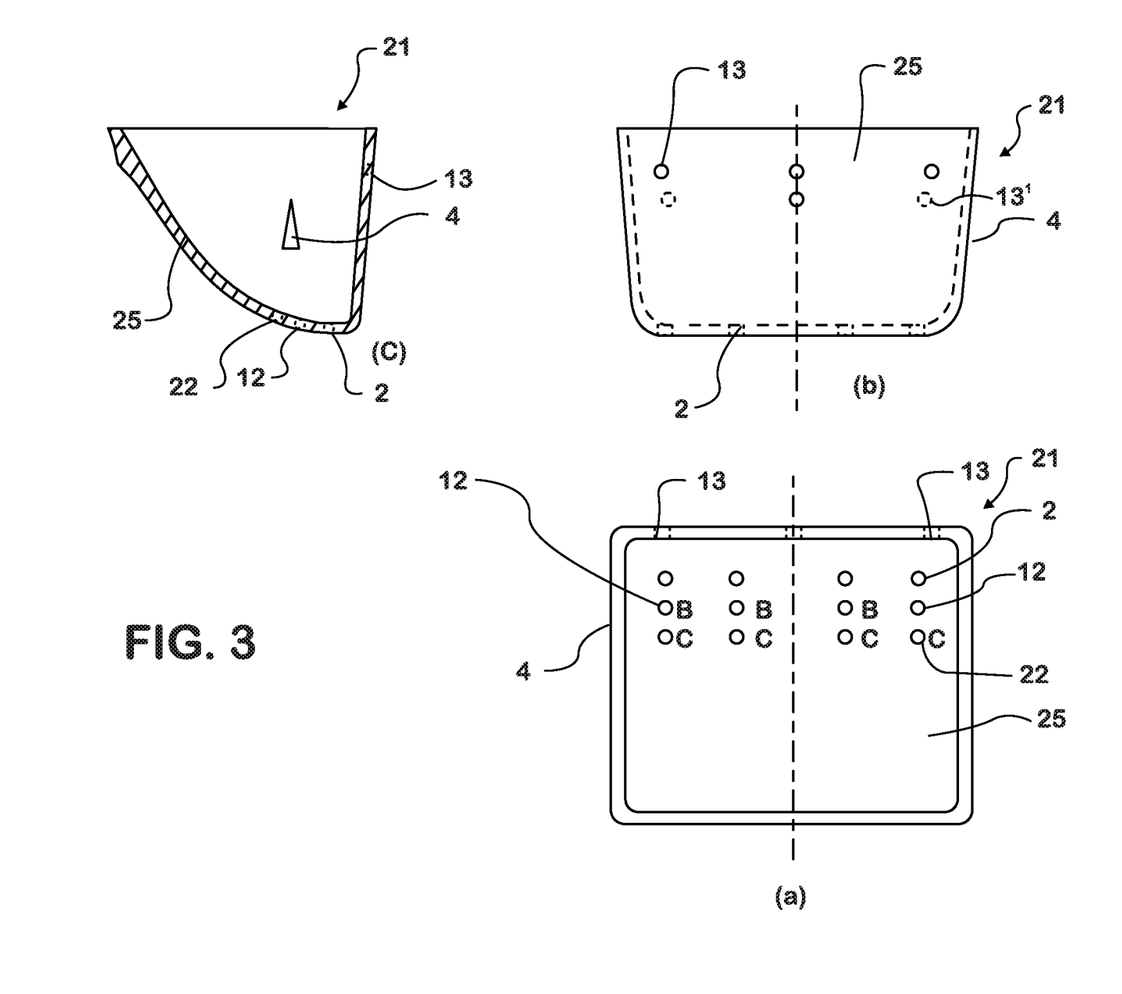
FIG. 3 provides plan, rear and cross-sectional views an elevator bucket in accordance with third aspects of the present invention.

FIGS. 1 to 3 provide illustrations of an elevator bucket made in accordance with aspects of the present invention. In FIG. 1 a first elevator bucket 1 is formed with a vent aperture feature pattern comprising a single row of four aperture elongate 30 orifices 2 in a well or bottom part of a scoop 5 forming the bucket 1. There are also aperture orifices 3 in a back of the scoop 5 and slanted elongate aperture orifices 4 in the sides of the scoop 5. The bucket 1 is formed by a moulding process with a plastics material in a suitable mould. The mould will have relief aperture features which will when a plastics material is moulded about them to form the bucket with the aperture orifices 2, 3, 4. As indicated previously providing a desired vent aperture orifice 2, 3, 4 for an end user is the desire.

FIG. 2 provides an illustration of a second elevator bucket 11 with two rows 5 of elongate or slot aperture orifices 2, 12 in a well or bottom part of a scoop 15. The elevator bucket 11 could be produced directly with the aperture orifices 2, 12 directly formed during the moulding process or aperture features 12' in FIG. 1 would be used to act as a minimum indicators as to where aperture orifices should be punched out. More advantageously with aspects of the present invention the aperture features 12' provide either upstanding ribs or ridges so that a punch is actually guided in forming each aperture orifice 12 or the aperture feature 12' is a depression or sink or recess in the thickness of the scoop 5, 15. The aperture orifice 12 can be more easily punched into the scoop 5, 15. It will also be seen in FIG. 1 that aperture features 13' are provided in a back of the scoop 5. These aperture features 13' have not been used in providing the second elevator bucket 11. Thus, the aperture feature 13' remains but there is no actual corresponding aperture orifice formed in the scoop 15.

In FIG. 3 a third elevator bucket 21 is illustrated with three rows of vent aperture orifices 2, 12, 22 in bottom or well part of a scoop 25. As previously the aperture orifices 2, 12, 22 can be directly formed by and during the moulding process but most advantageously the aperture orifices 12, 22 are provided by punching or otherwise the aperture features 12', 22' depicted in FIG. 1. Again the features 13' are not punched so only one row of apertures 13 is provided in the back of the scoop 15 in accordance with aspects of the present invention. Only some aperture features 12', 13', 22' to act as guides or aperture orifices pre-forms are illustrated in the FIGS. 1-3. It will be appreciate more extensive numbers and distributions of features can be provided in the moulding process. The aperture features whether initially as formed aperture orifices 2, 12, 22 or pre-forms 12', 13', 22' are grouped with references 16, 17 so the patterns can be readily identified by those needing to be punched or otherwise formed vent aperture orifices in a final pattern for an end user.

Figure 4:
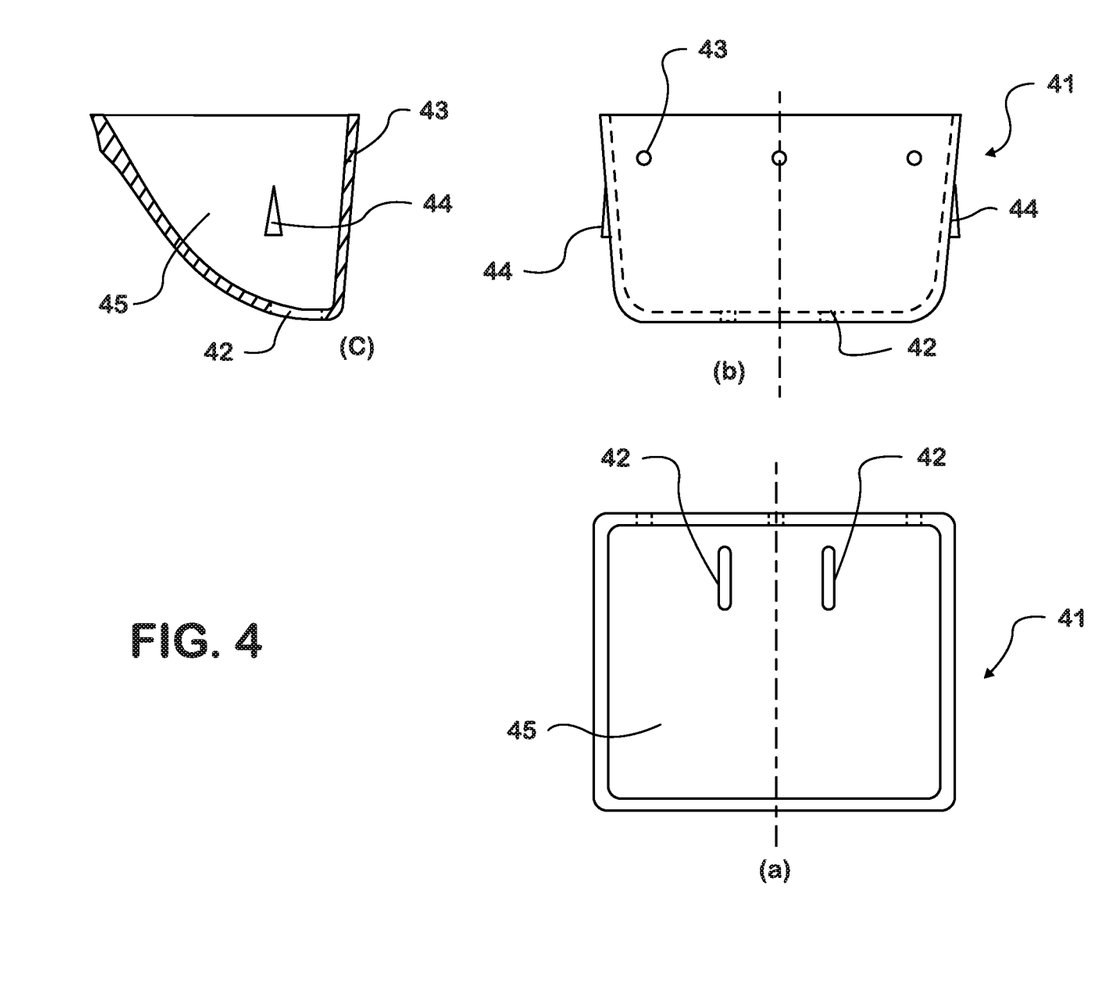
Figure 5:
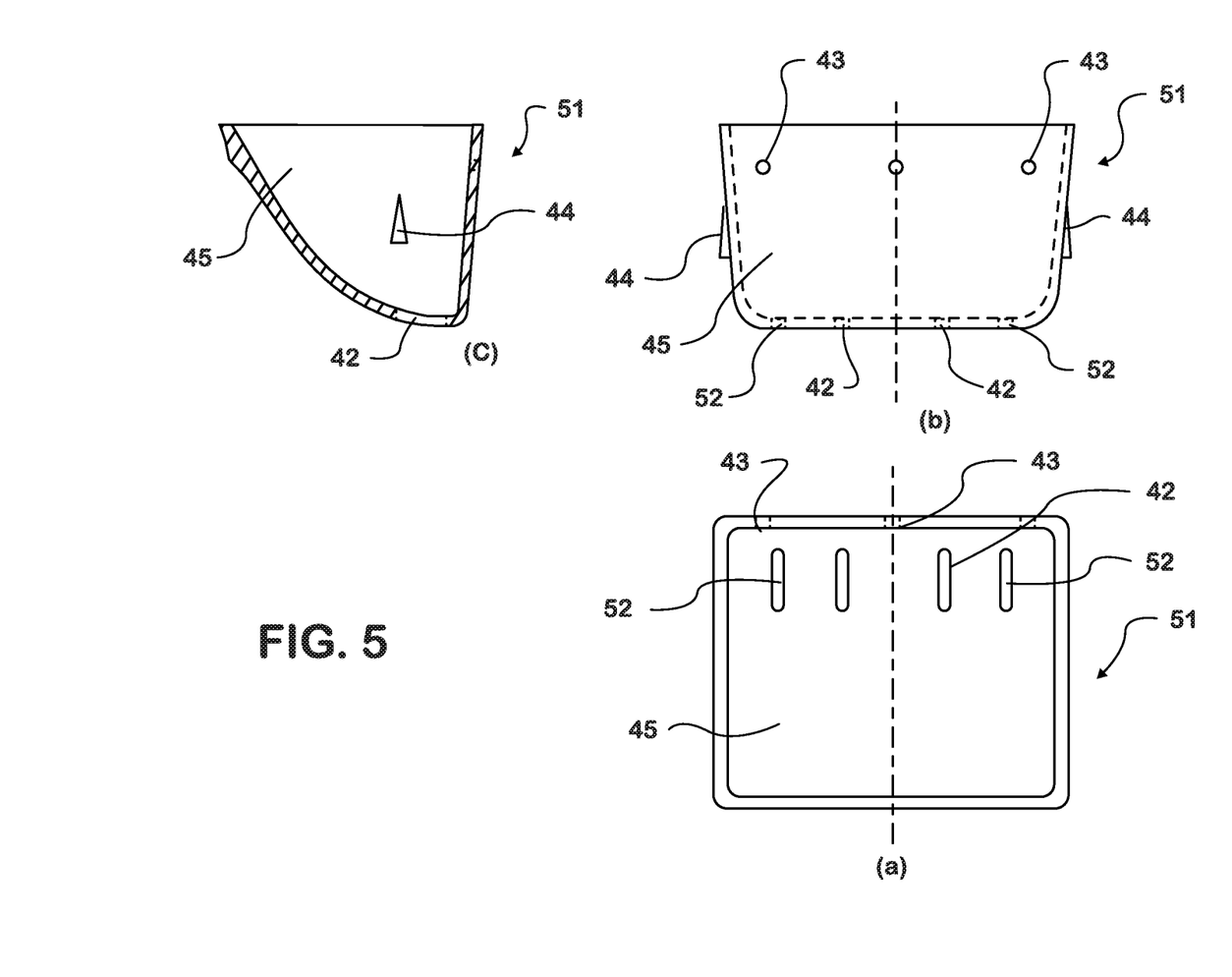
FIG. 5 is a plan view of an elevator bucket in accordance with fifth aspects of the present invention.
Figure 6:
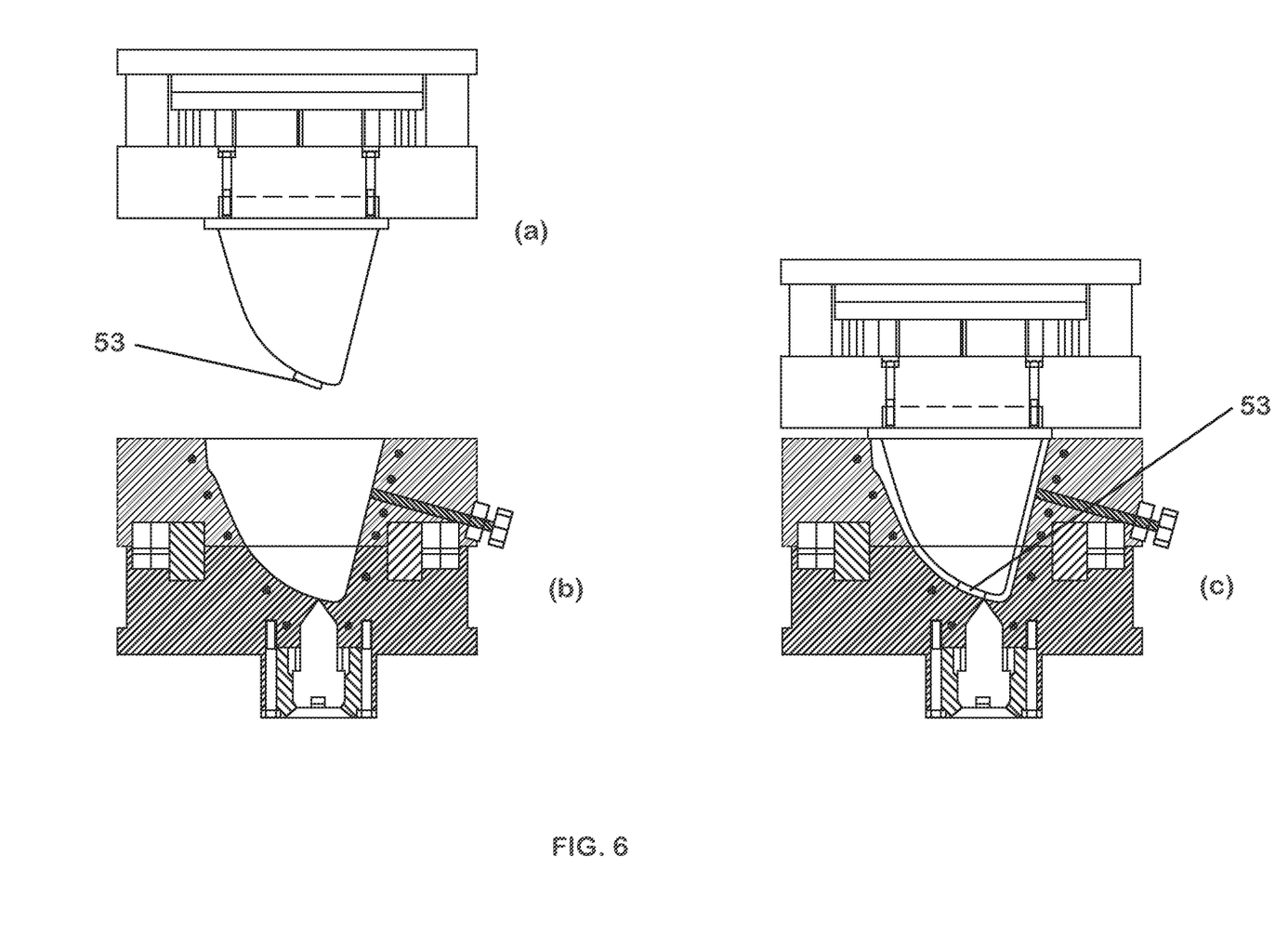
Figure 7:
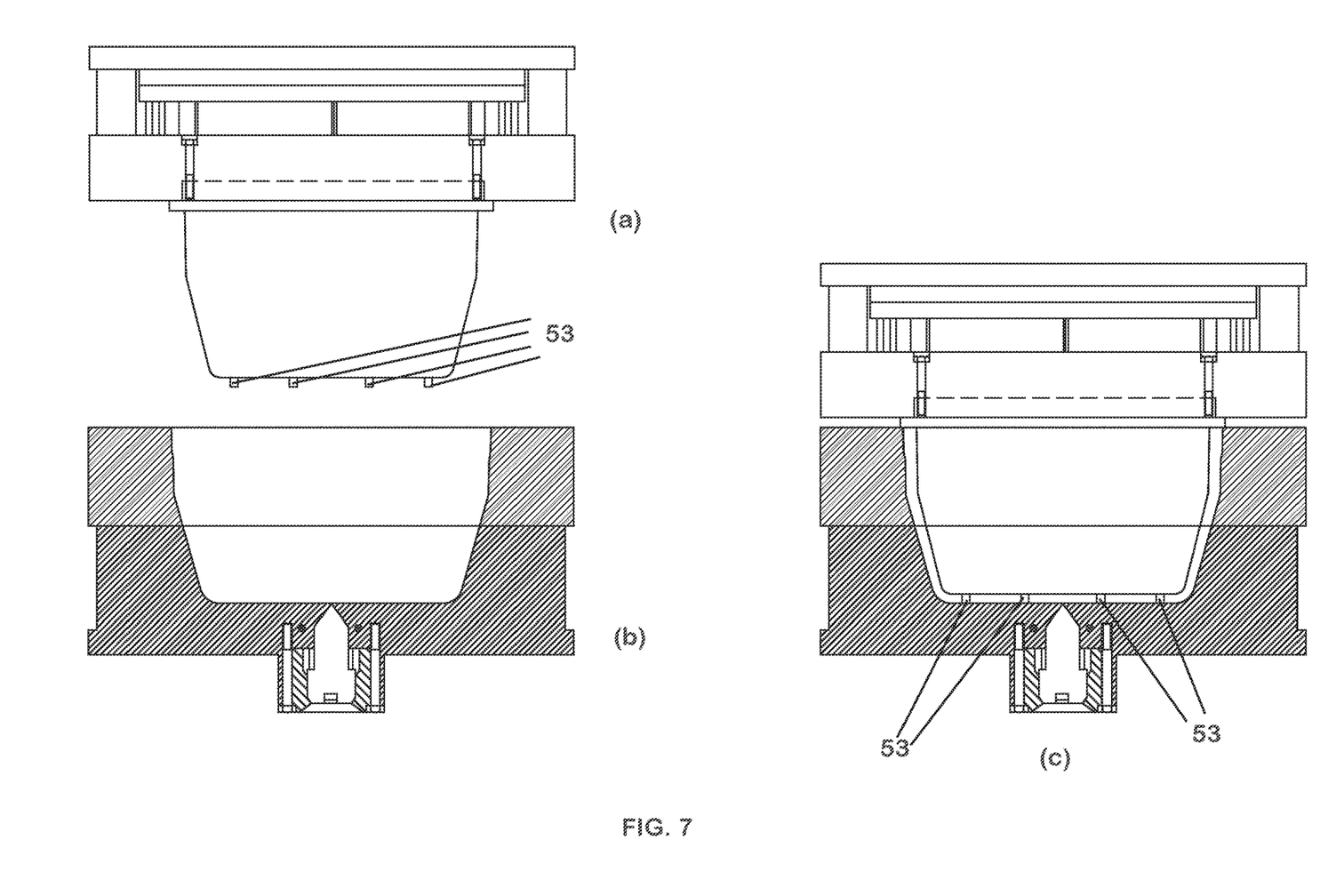
Figure 8:
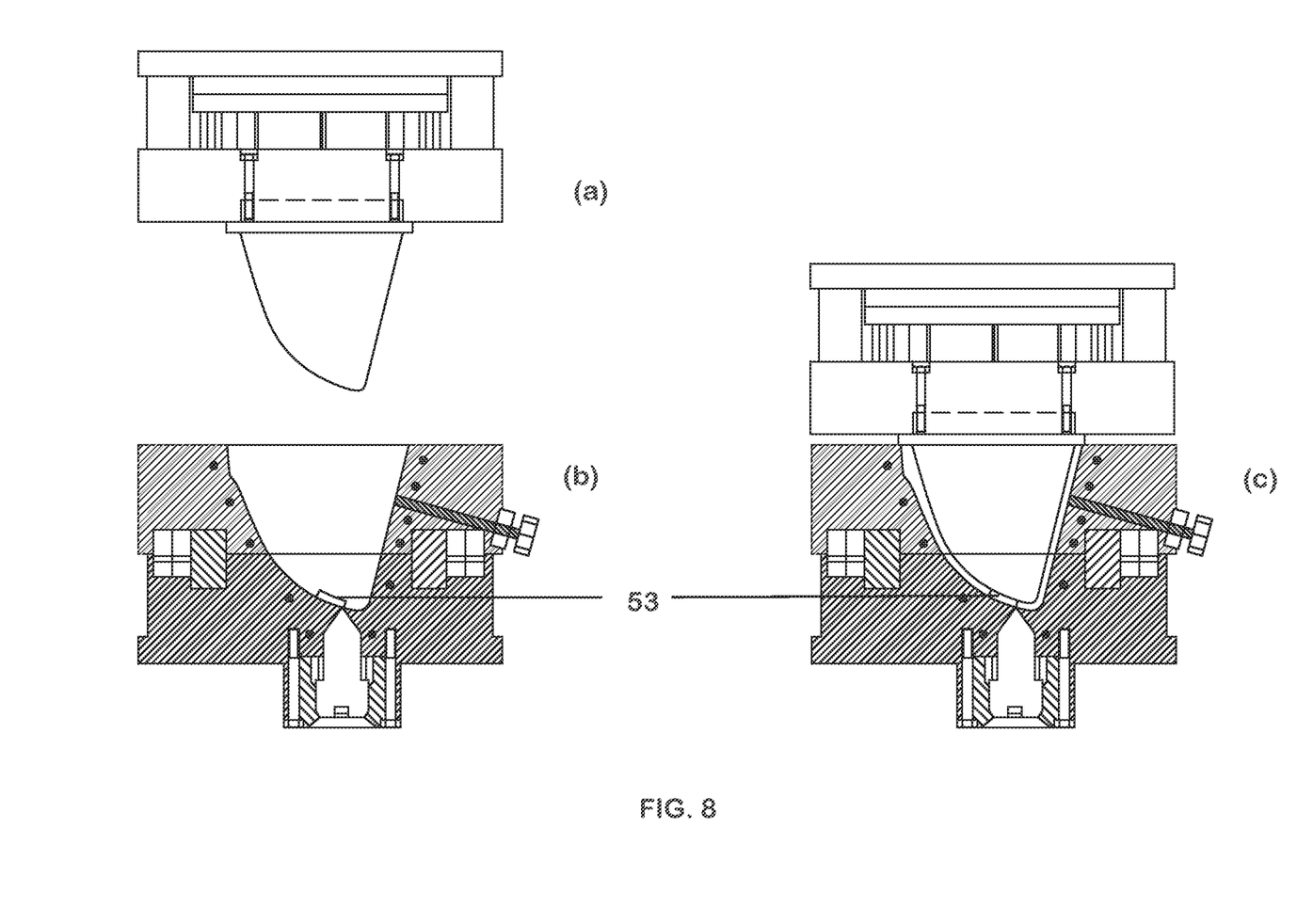
Figure 9:
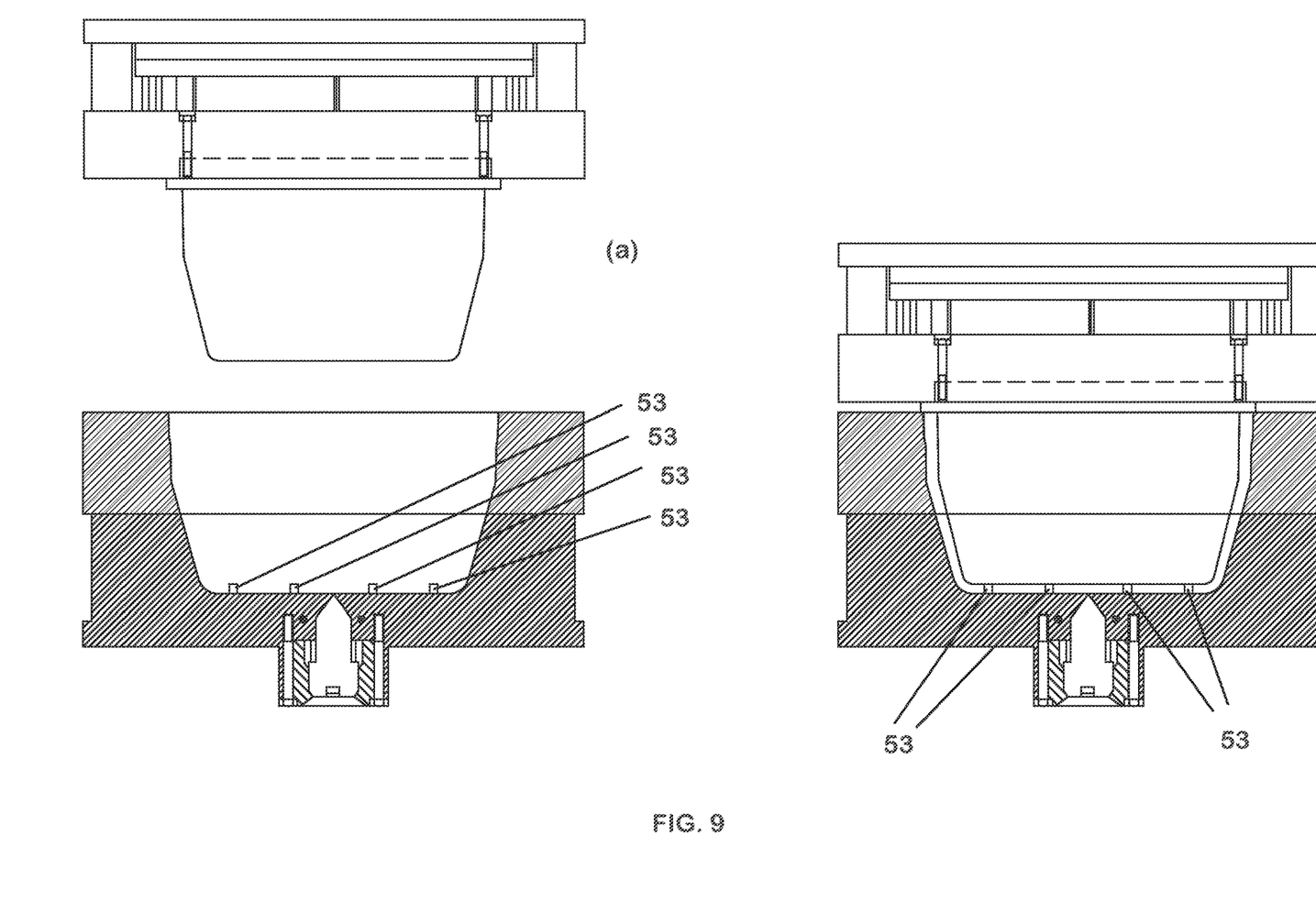

It will be understood that in accordance with aspects of the present invention a single mould is used to provide the three vent aperture orifice or slot patterns defined in FIG. 1, FIG. 2 and FIG. 3. Elevator buckets 1 will be formed and supplied for use with the single row of aperture orifices 2 if that is acceptable to an end user. However, some buckets 1 will be formed and held as a supply pre-stock of pre-forms to buckets 11, 21 capable of more rapid formation to second and third aperture patterns as shown respectively in FIGS. 2, 3 by the use and the guiding of the aperture features 12', 13', 22' to allow additional aperture orifices to be formed. The moulding process allows a variety of aperture orifices to be formed in addition to round drilled holes. Elongate orifices/features or slots as vents as indicated above have significant advantages over simple round drilled holes by less likelihood of blockage. FIG. 4 and FIG. 5 illustrate alternative aperture patterns can be provided. In FIG. 4 a fourth elevator bucket 41 has side-by-side parallel aperture 15 features as actual vent aperture orifices 42 in the form of slots and further aperture features 52' as ribs, ridges, depressions in a bottom or well part of a scoop 45. There are also further aperture features in the form of aperture orifices 43 in a back of the scoop 45 and aperture orifices 44 in the sides. As previously the aperture orifices 42, 43, 44 and other aperture features 52' are formed by the initial moulding process.

In order to provide as a different aperture pattern to that depicted in FIG. 4 in a final elevator bucket 52 as previously a base bucket 41 can be taken and the aperture feature 52' used to punch out the aperture orifice 52 in a slot form. It will be understood that it is much easier to mould advantageous elongate orifice features and slots than drill them so the feature will typically define a line of weakness in the bucket or of a thinner wall so allowing the aperture orifice 52 to be punched out to provide the elevator bucket 51. Nevertheless with raised ribs or ridges for the feature 52' these will act as proud guide features which may guide reaming or routing tools as well as other means to define a slot aperture orifice for the aperture orifice of the fifth elevator bucket 51. The ribs and ridges which may form the aperture features may also remain about aperture orifices in a final elevator bucket. Initially moulded aperture orifices may also include raised lips in the form of ribs and ridges about the periphery of the orifice 11 as well as radiate around and out from the orifice. Such remaining ribs and ridges may act to slightly lift a load within the scoop and/or inhibit shift of the load in the bucket and/or enable air flow in to the scoop of a bucket during loading and unloading of material from the bucket.

Turning to FIGS. 6, 7, 8, and 9, exemplary embodiments of an elevator mould with pegs 53 can be seen.

It will be appreciated by those skilled in the art that any number of combinations of the aforementioned features and/or those shown in the appended drawings provide clear advantages over the prior art and are therefore within the scope of the invention described herein.

The invention claimed is:

1. An elevator bucket comprising a scoop with a plurality of aperture features, at least one aperture feature defining an elongate orifice through a wall thickness of the scoop when initially formed to act as a vent for the bucket when filled with a bulk material having a dimension greater than a width of the elongate orifice;

the bulk material filling the bucket having said dimension greater than the width of the elongate orifice and the elongate orifice having a length greater than said width;
the elongate orifice venting air inside the bucket and out of the bucket when the bucket is being filled;
the elongate orifice being free of bulk material after the bucket is emptied; and
the bucket is made of a polymer material.

2. The bucket as claimed in claim 1 wherein the bucket is formed of a plastics material by moulding in a mould.

3. The bucket as claimed in claim 1 wherein the aperture features include a number of orifices in a wall of the scoop.

4. The bucket as claimed in claim 1 wherein the aperture features are a number of variations in the thickness depth of a wall of the scoop.

5. The bucket as claimed in claim 1 wherein the aperture features are a number of markings formed in the scoop.

6. The bucket as claimed in claim 5 wherein the markings are ridges or ribs or indentations in the scoop.

7. The bucket as claimed in claim 5 wherein the markings provide a guide for punching an orifice in a wall of the scoop.

8. The bucket as claimed in claim 1 wherein the aperture features define one or more predetermined orifice patterns in the scoop.

9. The bucket as claimed in claim 8 wherein each orifice pattern comprises a distinct type of aperture feature.

10. The bucket as claimed in claim 8 wherein each orifice pattern has a distinct number or letter or symbol for identification in the plurality of aperture features.

11. A method of forming an elevator bucket, the method comprising:

providing a mould for a plastics material, the mould having relief aperture features to define elongate aperture orifices in an aperture pattern in the bucket, wherein the relief aperture features comprise a depression or rib or ridge to form an aperture feature in relief within the elevator bucket;

rendering at least one aperture pattern active within the mould;

moulding an elevator bucket with a plastics material in the mould with that at least one aperture pattern; and forming at least one aperture orifice in the elevator bucket.

12. The method as claimed in claim 11 wherein the relief aperture features include a peg whereby an orifice is formed in the elevator bucket when moulded by the peg extending across a width of a wall of the elevator bucket as moulded.

13. The method as claimed in claim 12 wherein the peg is removed.

\* \* \* \* \*

UNITED STATES PATENT AND TRADEMARK OFFICE
CERTIFICATE OF CORRECTION

| | |
|---|---|
| PATENT NO. | : 10,961,056 B2 |
| APPLICATION NO. | : 16/243918 |
| DATED | : March 30, 2021 |
| INVENTOR(S) | : Nicholas Braime |

It is certified that error appears in the above-identified patent and that said Letters Patent is hereby corrected as shown below:

On the Title Page

Item [73], "BRAMME GROUP PLC" should be -BRAIME GROUP PLC-.

Signed and Sealed this
Third Day of September, 2024

Katherine Kelly Vidal
*Director of the United States Patent and Trademark Office*